United States Patent
Linney et al.

(10) Patent No.: US 10,142,489 B2
(45) Date of Patent: Nov. 27, 2018

(54) DIGITAL SUBSCRIBER LINE PROFILE SELECTION METHOD AND APPARATUS

(71) Applicant: British Telecommunications Public Limited Company, London (GB)

(72) Inventors: Trevor Linney, London (GB); Ian Horsley, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/300,958

(22) PCT Filed: Mar. 31, 2015

(86) PCT No.: PCT/GB2015/051005
§ 371 (c)(1),
(2) Date: Sep. 30, 2016

(87) PCT Pub. No.: WO2015/150798
PCT Pub. Date: Oct. 8, 2015

(65) Prior Publication Data
US 2017/0026522 A1    Jan. 26, 2017

(30) Foreign Application Priority Data

Mar. 31, 2014    (EP) .................................... 14250058

(51) Int. Cl.
*H04M 11/06*    (2006.01)
*H04B 3/46*    (2015.01)
(Continued)

(52) U.S. Cl.
CPC ............ *H04M 11/062* (2013.01); *H04B 3/46* (2013.01); *H04L 41/0813* (2013.01);
(Continued)

(58) Field of Classification Search
CPC .................................................. H04M 11/062
(Continued)

(56) References Cited

U.S. PATENT DOCUMENTS 6,404,357 B1 * 6/2002 Taunton ................. H04L 5/023
341/123
6,985,444 B1    1/2006 Rosen
(Continued)

FOREIGN PATENT DOCUMENTS

WO    WO 2009/122137 A1    10/2009

OTHER PUBLICATIONS

International Search Report for corresponding International Application No. PCT/GB2015/051005 dated Jun. 23, 2015; 4 pages.
(Continued)

*Primary Examiner* — Lihong Yu
(74) *Attorney, Agent, or Firm* — Amy M. Salmela; Patterson Thuente Pedersen, P.A.

(57) ABSTRACT

An Initial Profile Application Apparatus (IPAA) is operable to apply an initial profile to a modem pair connection system, the modem pair connection system comprising a first modem, a corresponding second modem and a metallic wire connection, wherein the first and second modems are operable to establish a data connection between themselves over the metallic wire connection. The IPAA comprises: a receiver; an evaluator; a line database; a comparator; a determiner; and an applicator.

5 Claims, 6 Drawing Sheets

(51) Int. Cl.
*H04L 12/24* (2006.01)
*H04L 12/26* (2006.01)
*H04L 12/28* (2006.01)
*H04M 3/30* (2006.01)

(52) U.S. Cl.
CPC ...... *H04L 43/0894* (2013.01); *H04L 12/2878* (2013.01); *H04M 3/304* (2013.01)

(58) Field of Classification Search
USPC .......................................................... 375/222
See application file for complete search history.

(56) References Cited

U.S. PATENT DOCUMENTS

| | | |
|---|---|---|
| 2006/0098725 A1 | 5/2006 | Rhee et al. |
| 2007/0002758 A1* | 1/2007 | Blackburn .......... H04L 43/0882 370/252 |
| 2010/0202441 A1 | 8/2010 | Haag et al. |
| 2011/0051906 A1 | 3/2011 | Cioffi et al. |

OTHER PUBLICATIONS

Written Opinion for corresponding International Application No. PCT/GB2015/051005 dated Jun. 23, 2015; 7 pages.

* cited by examiner

DIGITAL SUBSCRIBER LINE PROFILE SELECTION METHOD AND APPARATUS

CROSS-REFERENCE TO RELATED APPLICATIONS

The present application is a National Phase entry of PCT Application No. PCT/GB2015/051005, filed on 31 Mar. 2015, which claims priority to EP Patent Application No. 14250058.6, filed on 31 Mar. 2014, which are hereby fully incorporated herein by reference.

TECHNICAL FIELD

The present disclosure relates to a Digital Subscriber Line (DSL) profile selection method and apparatus, and in particular to a method and apparatus for selecting an initial profile to use for a DSL or similar copper pair transmission connection (e.g. a G.Fast connection).

BACKGROUND

WO 2009/122137 describes a system for selecting an initial profile to use within a DSL access network circa the priority date of March 2008. The invention particularly concerned the selection of a suitable profile for a line being moved into a rate adaptive mode of operation having previously been operated in a non-DSL mode (e.g. a Plain Old Telephone Services (POTS) mode) or in a fixed rate mode (i.e. a non-rate adaptive mode) in which profiles are generally not used in the same way as in a rate adaptive mode. In the access network described in WO 2009/122137, the rate adaptive mode of operation employed ADSL (including ADSL1, ADSL2 and ADSL2+ as specified in ITU standards G.992.1, G.992.3 and G.992.5 respectively), as did the non-rate adaptive broadband modes (although only ADSL1 and ADSL2). Moreover, when a user upgraded service from a POTS or non-rate adaptive service to a rate-adaptive service, the same copper connection was used for the new service as for the old service.

Since that time BT's access network (and many other access networks throughout the world) has (have) evolved to deploy fiber into the network between local exchange buildings and VDSL2-enabled street cabinets such that VDSL2 (G.993.2) is now used for many connections providing connection rates of (typically) up to 70 Mbits/second in the downstream direction (from cabinet to user premises) and up to 20 Mbits/second in the upstream direction (from user premises to cabinet). Moreover, it is anticipated that the next main evolution of the copper access network in the UK (and similarly in many other countries) will be the deployment of further optic fiber connections to DSLAM's located in Distribution Points (DP's) even closer to end user premises than street cabinets and employing G.Fast modems in both a DSLAM located in the drop point and in a corresponding Customer Premises Equipment (CPE) modem located in the customer's premises.

When a user upgrades to a VDSL2 service from another service (e.g. a POTS service, or an ADSL fixed rate or rate-adaptive mode service) the copper connection will typically be fundamentally different to that used in the previous service. This is because in the VDSL2 service the connection between the CPE and the Exchange now comprises a copper connection between the cabinet and the CPE modem and a fiber-optic connection between the cabinet and the exchange whereas previously there was a single copper connection between the CPE modem and the exchange. Similarly, for a user upgrading to a G.Fast connection in the future, the new connection will comprise a copper connection between the Distribution Point (DP) and the CPE modem with a fiber-optic connection between the DP and the Exchange whereas previously the user would have had either a copper connection between the CPE modem and the exchange (e.g. for ADSL and POTS services) or (for VDSL2 services) a copper connection between the CPE modem and the cabinet and a fiber optic connection between the cabinet and the exchange.

Furthermore, as the access networks have evolved, so have the DSL protocols employed in the newer better services. This has provided more control options for operators to use in order to control the behavior of a connection. In addition, operators have started to control connections by setting a cap on the maximum rate at which a particular connection can synchronize (below the maximum rate available for a particular DSL protocol being employed—e.g. 100 Mbits/s for VDSL2 connections using up to approximately 17 Mhz). These developments have led to a large increase in the number of protocols used in controlling DSL connections compared to the access network described in WO 2009/122137.

Because of these developments the approach described in WO 2009/122137 is no longer optimal for new VDSL2 connections, both because the performance of the copper connection has changed (i.e. reduction in length) and the transmission system has an increase in spectrum from 2.2 MHz to 17.6 MHz such that measurements associated with the old service will have less bearing on the likely behavior of the new service (because the physical copper connection is very different in the new service compared to the previous services) and because there are now so many very different profiles in use, a simple hard-coded rule of thumb type approach is less feasible. For these reasons, many access networks simply use a default initial profile when initializing a new service and then allow Dynamic Line Management (DLM) to modify the profile employed for a new connection until a more appropriate profile is finally selected after several iterations of the DLM process.

The use of higher frequencies have also made factors such as method of installation and local noise factors far more important when trying to select an initial profile.

SUMMARY

According to a first aspect of the present disclosure, there is provided a method of applying an initial profile to a modem pair connection system, the modem pair connection system comprising a first modem (such as, in one embodiment, a Digital Subscriber Line (DSL) modem within a DSL Access Multiplexor (DSLAM)), a corresponding second modem (such as, in one embodiment, a DSL modem forming part of a Customer Premises Equipment (CPE) device) and a metallic wire connection (such as, in one embodiment, a twisted metallic pair, usually formed from a twisted pair of copper wires), wherein the first and second modems are operable to establish a data connection between themselves over the metallic wire connection, the method comprising: receiving new-order information associated with a new order placed by a customer for a new broadband data connection to be supplied over the modem pair connection system; evaluating a set of risk factors for the new order based on the received new-order information (the evaluation preferably including performing one or more measurements associated with the metallic wire connection of the modem pair connection system); comparing the set of evaluated risk factors for the new order with corresponding risk factors for established modem pair connection systems, using a database storing information about a plurality of established modem pair connection systems which information includes values for the corresponding risk factors of each of the plurality of established modem pair connection systems, or information permitting the evaluation of such values, and information about a profile applied to each of the plurality of established modem pair connection systems; determining an initial profile to apply to the modem pair connection system based on the comparison of risk factors; and applying the determined initial profile to the modem pair connection system.

The modems are, in one embodiment, Digital Subscriber Line (DSL) modems in the sense that they use a DSL protocol. The term DSL protocol is used in this specification to mean any protocol within the well-known suite of xDSL protocols including ADSL (including ADSL2 and ADSL2+), VDSL (including VDSL2) and HDSL (by way of example only), as well as protocols still currently undergoing standardization (e.g. G.FAST) and protocols not yet developed but suitable for use in transmitting broadband data signals over twisted metallic pairs.

The first aspect of the present disclosure provides a powerful and flexible way for selecting an initial profile which will nearly always be a "better" starting profile than if a default profile is used for all modem pair connection systems (hereinafter, the term "line" will be used as shorthand for the term "modem pair connection system" in accordance with standard practice in this field), where "better" in this case means that the starting profile is "closer" to the "correct" profile for the line, where "correct" means the profile that the line would ultimately have applied to it after a period of control by a dynamic line management system which seeks to optimize the profile applied to each controlled line by applying a closed loop control feedback mechanism in which the line's operation is monitored and modifications are made from time to time to the profile applied to the line to try to optimize the line's operation according to some predetermined operation criteria (e.g. of balancing stability of the line as measured by number of errors and resynchronizations occurring on the line, with performance of the line as measured by parameters such as bandwidth/data rate of the line and delay on the line). In one embodiment, the method does indeed further comprise controlling the operation of the line using a Dynamic Line Management (DLM) system in order to further improve the profile applied to the line over time.

Moreover, the first aspect of the present disclosure can be used in situations where the line is being used for the first time in its current form.

In one embodiment, therefore, the new order information relates to a new order for broadband data to be supplied over the modem pair connection system/line for the first time, in particular, where the twisted metallic pair connection has not been used, in its current form, for a data connection before. Examples of this is where a customer is upgrading from an ADSL broadband service provided over a twisted metallic pair between an exchange building and the customer premises directly and is now upgrading to a VDSL2 service where the twisted metallic pair connection is now terminated at a street cabinet rather than at the exchange, and the backhaul connection from the street cabinet to the exchange is now provided by a fiber optic connection. Although the same twisted metallic pair is actually (in part) used between the customer premises and the street cabinet in both the old ADSL service and the new VDSL service, for the purposes of the present disclosure, it can be considered a new connection since it is fundamentally different to the entire twisted metallic pair connection when it was terminated at the exchange—in terms, in particular, of the physical properties of the twisted metallic pair connection as a whole. A similar example of using a "new" twisted metallic pair for the first time is where a twisted metallic pair previously terminated at the street cabinet for a VDSL service is now terminated at a distribution point and G.FAST modems are connected to each other over the shorter twisted pair connection to provide a G.FAST connection in place of either an ADSL connection (all the way to an exchange building) or a VDSL2 service with a twisted metallic pair connection between customer premises and a street cabinet.

The use of a set of risk factors provides great flexibility in terms of the factors which can be used when attempting to select an appropriate initial profile for the line. Generally the factors relate in some way to physical technical aspects of the line even if the relationship is an indirect one. For example, in countries where regulatory requirements permit this, a risk factor might relate to the identity of the "Communications Provider (CP)" which has made the order (from a network operator entity which sells wholesale "products" to CP's (which are business entities providing services to individual consumers), the wholesale "products" being services provided to CP's which then on-sell the services to end consumers). This information can, in a statistical manner, be associated with a likelihood of certain customer premises modems being used for a particular line since the CP may have an influence over which type of CPE modem is used for a given line. Similarly, information as to whether the new service is to be self-installed or installed by an engineer may also have an effect on the physical properties of the final connection, since, statistically, there may be a correlation between the likelihood of a connection having a bridged tap and the nature of the installation (in terms of whether it was a self-install installation or an engineer installed installation); this correlation may exist because an engineer may remove bridged taps as part of the installation process more frequently than would a customer performing a self-install.

Note that where regulatory requirements would not permit the identity of a CP to be used as a risk factor, it may still be possible to use the sub-factors (for which the CP identity was being used as a proxy) directly instead where these are available; for example it may be possible to use the actual model of CPE and whether it was a self-install or a managed install (i.e. installed by a professional installation engineer) directly instead where this information is directly available to the system, thus avoiding the need to use CP identity as a risk factor at all.

The method of the first aspect is also sufficiently robust that no measurements need to be known about the performance of the line prior to the new service being operated over the line. The method is therefore particularly suited to new connections where such information is not available.

The application of a profile to a line is normally done by applying the profile to the network side modem of the line/modem pair connection system, which normally acts as the master of the pair of modems. The network side modem is usually contained within an aggregation device such as a DSL Access Multiplexor (DSLAM) where several network side modems are co-housed and the signals received by each of these modems are multiplexed onto a single backhaul data connection from the DSLAM to the next aggregation point in the access network upstream from the DSLAM (e.g. at an exchange or a street cabinet for a VDSL enabled street cabinet or a G.FAST enabled distribution point for a typical VDSL2 or G.FAST system respectively). However, embodiments are equally applicable to systems where a profile can be applied to either or indeed to both modems of the line.

Naturally, the comparison of risk factors of established lines is for lines of the same technology (i.e. compare VDSL2 lines with other VDSL2 lines and compare G.FAST lines with other G.FAST lines). This can be done by using separate databases which only contain information about the lines using the same technology, or an initial filter could be performed to exclude lines of a different technology from being used in the comparison.

In one embodiment, the different risk factors are compared in one of the following two ways: either the comparison is done on a risk factor by risk factor basis (i.e. where, for each risk factor, an "average" set of profile attribute values is calculated for all lines having a corresponding risk factor value, and then the average profile attribute values are combined to generate an average-of-averages set of attribute values based on a weighted combination of each set of "average" profile attribute values) or it is done a whole set of risk factors basis (i.e. on an averaged set of attribute values for just those profiles whose (complete set of) risk factors correspond to the (corresponding complete set of) risk values of the new order). In this second, whole set of risk factors basis case, if the number of established lines having a corresponding risk factor value for all of their risk factors (the target set of wholly matching lines) is below a threshold number of such wholly matching lines, then the target set of wholly matching lines may be expanded by increasing the range of risk factor values deemed to match the new order risk factor values. In some embodiments a threshold target number of wholly matching lines may be set to as low as one (clearly at least one is required for this method to work); however, in some embodiments a much larger number such as 100 or 200 may be chosen such that the average value of all such profiles gives a (statistically) more reliable average value of appropriate attribute values.

The risk factor by risk factor approach has the advantage that it can work even with a relatively small database of established lines. The whole set of risk factors approach has the advantage that it may provide a "better" set of attribute values (where "better" again means closer to the profile that a DLM process would ultimately select for the line such that it takes less long for the DLM to converge onto that ultimately targeted profile) where there is a sufficient amount of data available.

Averaging can be advantageously performed by identifying a median or percentile value of profile attribute values. The exact mechanisms for achieving this are described in greater detail below. The advantage of doing this is that one is more likely to arrive at a value for a profile attribute (e.g. specifying a maximum rate of connection cap) associated with an existing stored profile available for applying to the line. In embodiments where it is possible to create new profiles as necessary the approach tends to inhibit the proliferation of new similar profiles.

According to a second aspect of the present disclosure, there is provided an apparatus for applying an initial profile to a modem pair connection system, the modem pair connection system comprising a first modem (such as, in one embodiment, a Digital Subscriber Line (DSL) modem within a DSL Access Multiplexor (DSLAM)), a corresponding second modem (such as, in one embodiment, a DSL modem forming part of a Customer Premises Equipment (CPE) device) and a metallic wire connection (such as, in one embodiment, a twisted metallic pair, usually formed from a twisted pair of copper wires), wherein the first and second modems are operable to establish a data connection between themselves over the metallic wire connection, the apparatus comprising: a receiver for receiving new-order information associated with a new order placed by a customer for a new broadband data connection to be supplied over the modem pair connection system; an evaluator for evaluating a set of risk factors for the new order based on the received new-order information (the evaluation preferably including performing one or more measurements associated with the metallic wire connection of the modem pair connection system); a line database storing information about a plurality of established modem pair connection systems which information includes values for the corresponding risk factors of each of the plurality of established modem pair connection systems, or information permitting the evaluation of such values, and information about a profile applied to each of the plurality of established modem pair connection systems; a comparator for comparing the set of evaluated risk factors for the new order with corresponding risk factors for established modem pair connection systems using information from the line database; a determiner for determining an initial profile to apply to the modem pair connection system based on the comparison of risk factors; and an applicator for applying the determined initial profile to the modem pair connection system.

In one embodiment, the apparatus further includes a store for storing a plurality of profiles from which to select the initial profile to be applied to the modem pair connection system determined by the determiner. However, some alternative embodiments may further include a profile assembler for assembling a profile based on a number of profile attribute values determined by the determiner as a part of the determining of an initial profile.

In one embodiment the apparatus further comprises a Dynamic Line Management system for monitoring the operation of the modem pair connection system during its operation after having applied an initial profile to the system and from time to time applying a different profile to the system in dependence upon the results of monitoring the system, in order to drive the operation of the system towards a target level of operation based on observed operational parameters of the system.

The components of the apparatus may be distributed across multiple different devices located in different locations. For example, the line database may be located in a central location for use by a number of different devices and storing information about a large number of different lines associated with an access network as a whole, whilst other components may be co-located with (a part of) the modem pair connection system (e.g. as part of a DSLAM located at a street cabinet or at a distribution point).

Further aspects of the present disclosure relate to processor implementable instructions for carrying out the method of applying an initial profile to a modem pair connection system according to the first aspect of the present disclosure and to a carrier medium, advantageously a non-transient carrier medium such as an optical or magnetic storage disk or a solid state memory device, carrying processor implementable instructions for causing a processor or processors to carry out that method.

BRIEF DESCRIPTION OF THE DRAWINGS

In order that the present disclosure may be better understood, embodiments thereof will now be described, by way of example only, with reference to the accompanying drawings in which.

DETAILED DESCRIPTION OF EMBODIMENTS

Figure 1:
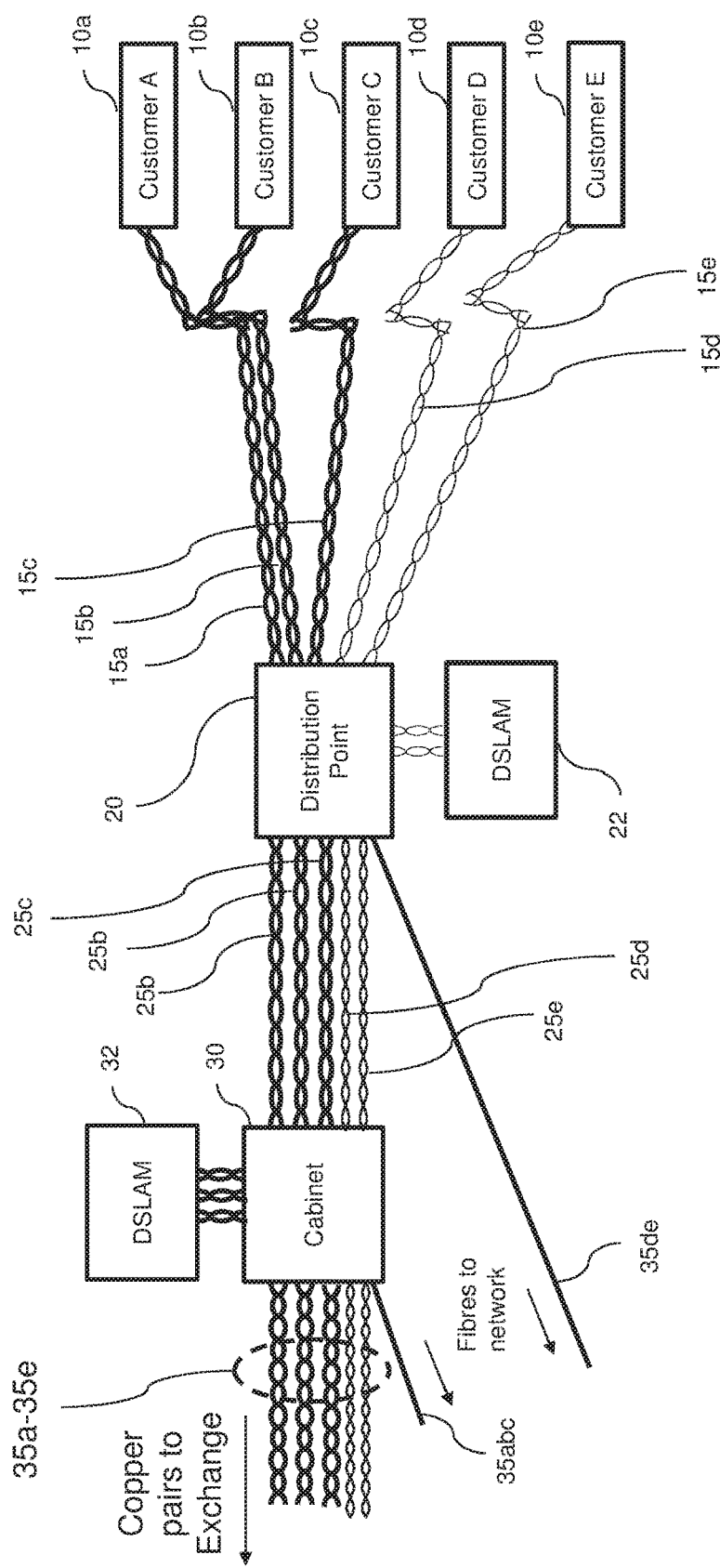
FIG. 1 is a schematic illustration of a part of an access network illustrating typical cases in which different DSL technologies may be used, and within which aspects of the present disclosure may be employed.

FIG. 1 illustrates a portion of an access network. As shown, the illustrated portion includes several customer premises 10a-10e, a Distribution Point 20 with an associated DSLAM 22, a cabinet 30 with an associated cabinet DSLAM 32, some twisted metallic pairs 15a-15e, 25a-25e, 35a-35e and some optic fibers 35abc, 35de. The Figure illustrates that as an access network evolves it places optic fiber closer and closer towards the customers' premises. Thus before any optic fiber was installed beyond a local exchange building, each customer 10a-10e would have a single metallic twisted pair extending all the way from the customer premises via the distribution point 20 and the cabinet 30 back to a local exchange building (not shown). When a fiber optic is installed at the cabinet 30 all of the lines are capable of being diverted to a DSLAM 32 located at the cabinet and the signals between the cabinet and the local exchange can instead be sent over a fiber optic cable 35abc. The sections of the metallic twisted pairs 35a-35e from the cabinet to the exchange are usually left in place and a customer only has their line switched to the cabinet DSLAM 32 when they wish to upgrade to a new service (e.g. a VDSL2 service which can typically provide much higher speeds than the ADSL service originally provided from the local exchange over the entire twisted metallic pair). The old twisted metallic pair may still be used to carry POTS signals between the customer's telephone and the local exchange with only data signals being terminated at the DSLAM 32.

A similar process occurs when a customer wishes to upgrade to an even newer faster service (e.g. a G.FAST service) via a DSLAM 22 located at a distribution point 20 with a corresponding fiber optic backhaul connection 35de from the distribution point 22 to the local exchange. It should be noted that in such a case, the new connection (e.g. a VDSL2 connection from cabinet 30 to customer A 10a, or a G.FAST connection from distribution point 20 to Customer E 10e) passes over a twisted metallic pair connection (25a and 15a or 15e alone respectively) which is fundamentally different to that which the previous service passed over (15a, 25a and 35a for Customer a and either 15e, 25e and 35e for an ADSL to G.FAST upgrade or 15e and 25e only for a VDSL2 to G.FAST upgrade for Customer E) even though parts of the twisted metallic connection are common in all cases (i.e. 15a-15e).

Figure 2:
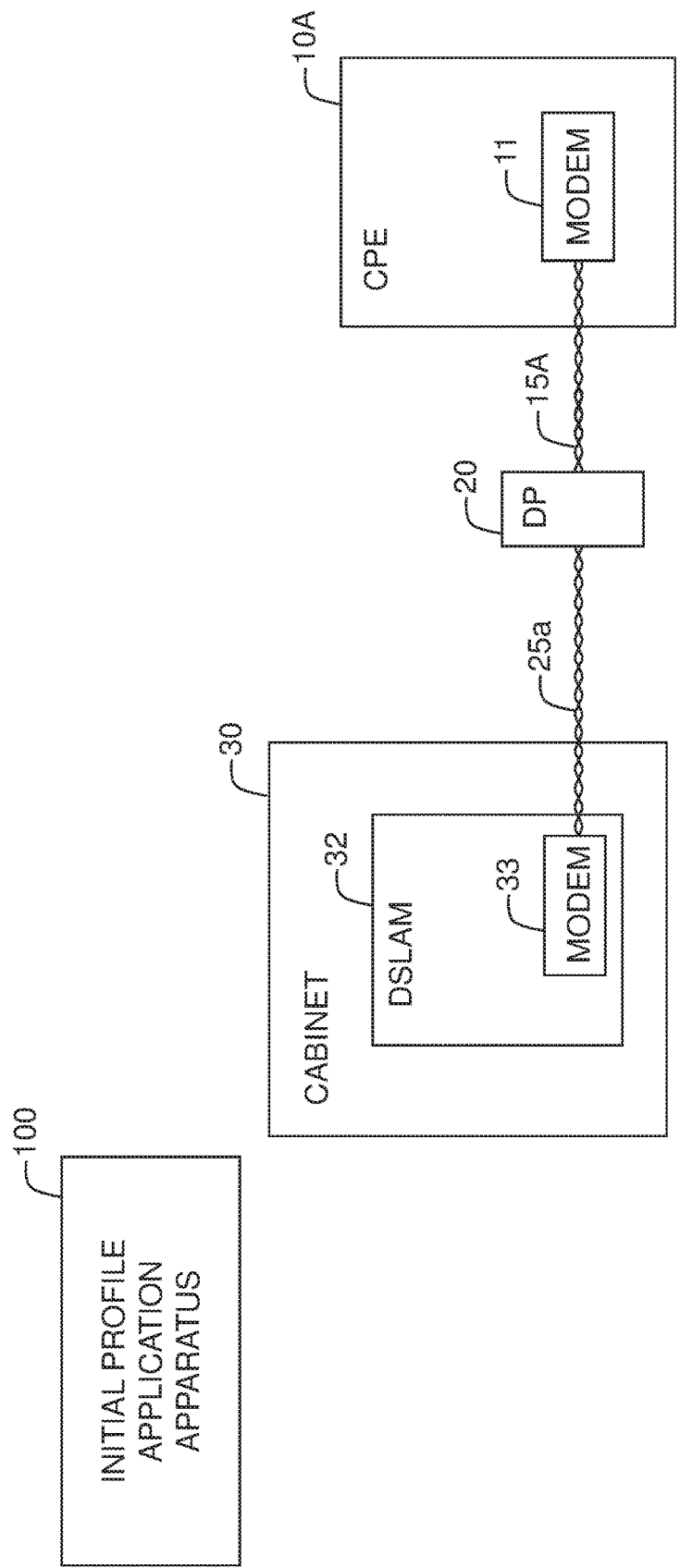
FIG. 2 is a schematic block diagram of an initial profile application apparatus together with a modem pair connection system.
Figure 3:
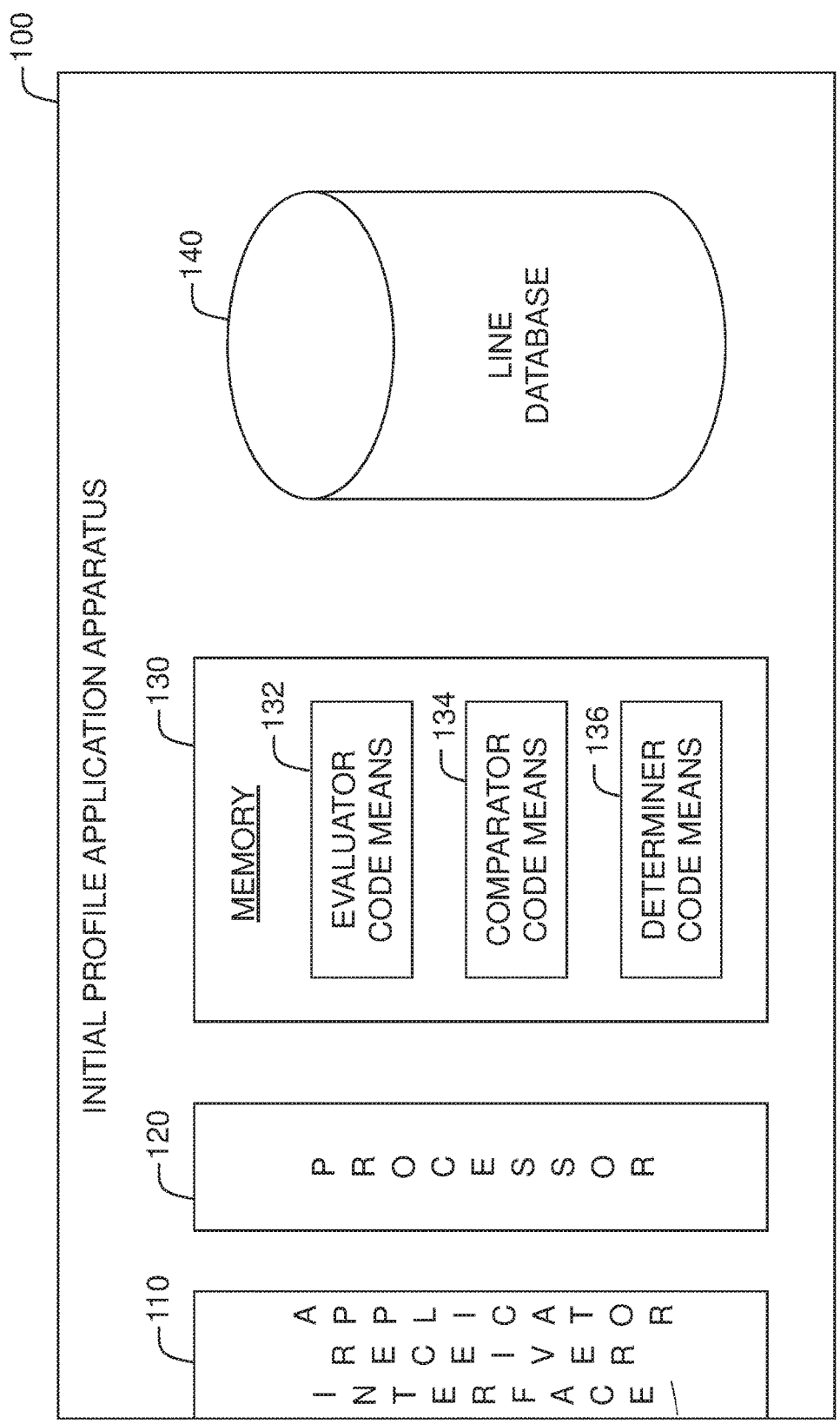
FIG. 3 is a schematic block diagram illustrating the initial profile application apparatus of FIG. 2 in greater detail.

FIG. 2 illustrates just one of the connections shown in FIG. 1 together with an additional Initial Profile Application apparatus 100 according to embodiments of the present disclosure. The initial profile application apparatus 100 which is shown in greater detail in FIG. 3, is operable to apply an initial profile to a modem pair connection system 5 (also hereinafter referred to as line 5) which is made up of a modem 33 within the DSLAM 32, a modem 11 within the CPE 10a and the twisted metallic pair connection 25a, 15a extending between the modems 33, 11. The profile (or an identification thereof) applied by the initial profile application apparatus is sent to the DSLAM which then ensures that when the line first synchronizes after having been suitably instructed by the initial profile application apparatus, it does so in accordance with the applied initial profile in a conventional manner.

FIG. 3 illustrates the Initial Profile Application Apparatus (IPAA) 100 of FIG. 2 in greater detail. As shown it comprises an Interface/Receiver/Applicator 110 through which new order information is received as well as through which an initial profile is applied to the line 5 associated with the new order. The IPAA 100 also includes a processor 120 a memory 130 and a Line Database 140. The memory 130 stores various code means each of which, when executed by the processor 120 causes a corresponding module to be implemented. The various code means stored within the memory 130 include Evaluator code means 132, comparator code means 134 and determiner code means 136 which give rise to an evaluator module, a comparator module and a determiner module respectively. The evaluator module evaluates risk factor values for the new order when new order information is received. In the present embodiments, the new order information includes: an indication of the product which has been ordered (from which it is possible to ascertain whether the end customer will self-install his/her CPE modem or whether an engineer for the CP company will perform the installation of the CPE modem) the identity of the Communications Provider (CP) which has made the new order (from which it may be possible to estimate which CPE modem will be used as discussed below), the telephone number or other identifier of the actual line on which the service is to be provided from which the IPAA can ascertain (via external databases storing equipment inventories and line plant records) the loop length of the section of twisted metallic pair 15a,25a between the Cabinet 30 and the CPE 10a, the vendor of the DSLAM 32 and the postcode or other geographical region identifier of the cabinet 30. Note that in alternative embodiments, rather than the IPAA obtaining the ascertained information itself this could be done by an external device and the new order information might then contain only the information actually required by the IPAA to perform the following described operations.

Having ascertained the following information about the new order: installation option of the new order, CP identity for the new order, DSLAM vendor of DSLAM 30, geographical region identifier (e.g. postcode) and loop length, the evaluator module assigns risk factor values as follows: set Product risk factor to SI for self install or to MI for engineer install; set CP to a CP ID code A, B, C, D, . . . according to CP identity, set DSLAM vendor to corresponding ID code for DSLAM vendors X, Y, Z, . . . according to the DSLAM vendor, set Loop Category to one of Short, Medium, Long or Very Long according to predefined ranges in accordance with identified loop length, and set Region to first half of postcode value.

The comparator module is operable to compare this set of risk factors with corresponding risk factors of established lines contained within the line database 140 in a manner described in greater detail below with reference to FIGS. 4 and 5 (for a first embodiment) and with reference to FIGS. 4 and 6 (for a second embodiment). The output provided by the comparator module is a set of profile value attributes and these are then input to the determiner module which determines from the set of profile attribute values an initial profile to apply to the line 5. In the present embodiments, the profile attributes are rate cap (Max Speed), a specified minimum permitted speed (Min Speed), a target margin (Margin) and a level of impulse noise protection (INP). Each of a plurality of different profiles used in the present embodiments specify different values for these profile attributes. If the profile attributes input to the determiner module exactly match a single profile, then that profile is chosen. Otherwise, the determiner module is operable to select a profile which represents a best fit to the input profile attributes, in the present embodiment, by selecting the profile for which each of the attributes of the profile is as close as possible to the input attribute without being less conservative than the corresponding input parameter. In the present embodiments, Max Speed goes from less to more conservative as the value decreases, Min Speed goes from less to more conservative as the value decreases, Margin goes from less to more conservative as the value increases and INP goes form less to more conservative as the value increases. In alternative embodiments, the determiner module may alternatively generate a new profile based on the input profile attributes output from the comparator module.

The Line database 140 stores records of established lines including a line index identifier, risk factor values, profile ID of the currently applied profile, information about the CPE modem device of the line and information about the time since a fault was last identified on the line and the time since the line was last reset, for each line in the database. Some example records are set out in the examples which follow below after a discussion of FIG. 4-6.

Figure 4:
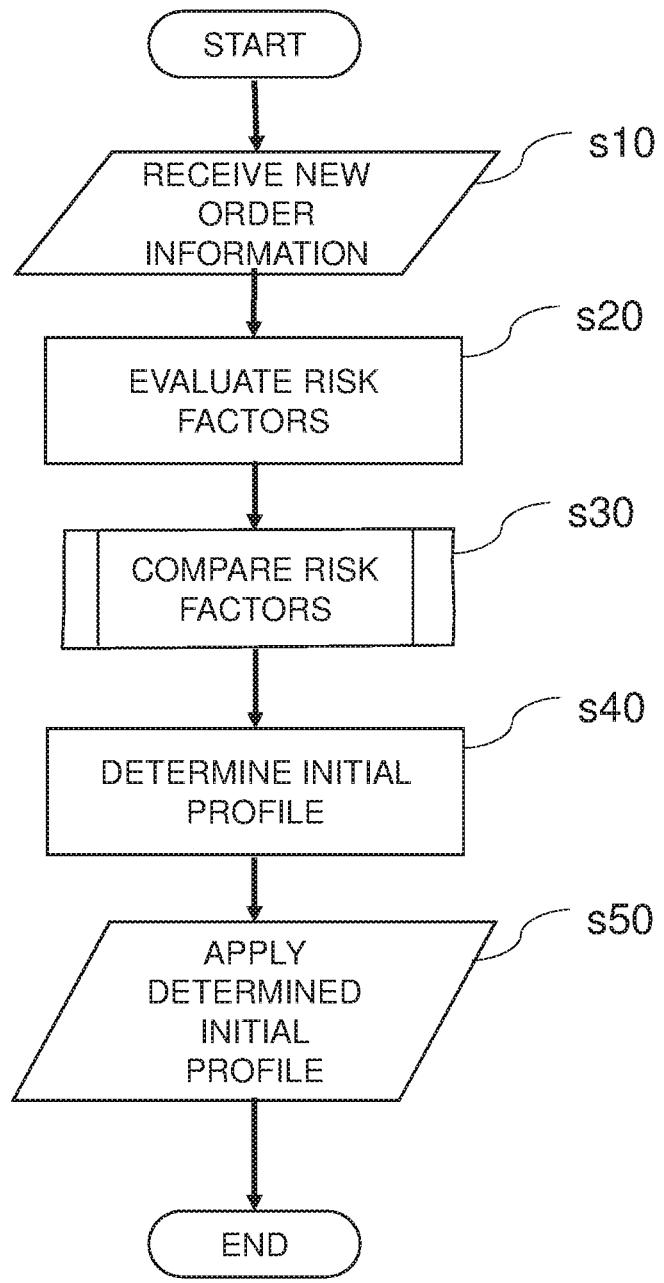
FIG. 4 is a flow chart illustrating the tasks performed by the apparatus of FIG. 3.

FIG. 4 illustrates the tasks performed by the IPAA 100 in order to apply an initial profile to a line 5 associated with a new order. The method starts at s10 in which the new order information is received by the IPAA 100 via the interface/receiver/applicator 110. The method then proceeds to s20 in which the evaluator module evaluates the risk factors for the new order based on the information received at s10. The method then proceeds to the subroutine s30 in which the risk factors evaluated in s20 are compared with the risk factors of established lines using the information contained within the line database 140. As a result of the comparison, the comparator module outputs a set of profile attribute values. The method then proceeds to s40 in which the profile attribute values output by the comparator module at s30 are provided to the determiner module which determines an initial profile to apply to the line 5 associated with the new order. Finally, at s50 the determined profile is applied (via the interface/receiver/applicator 110) to the new line 5.

Figure 5:
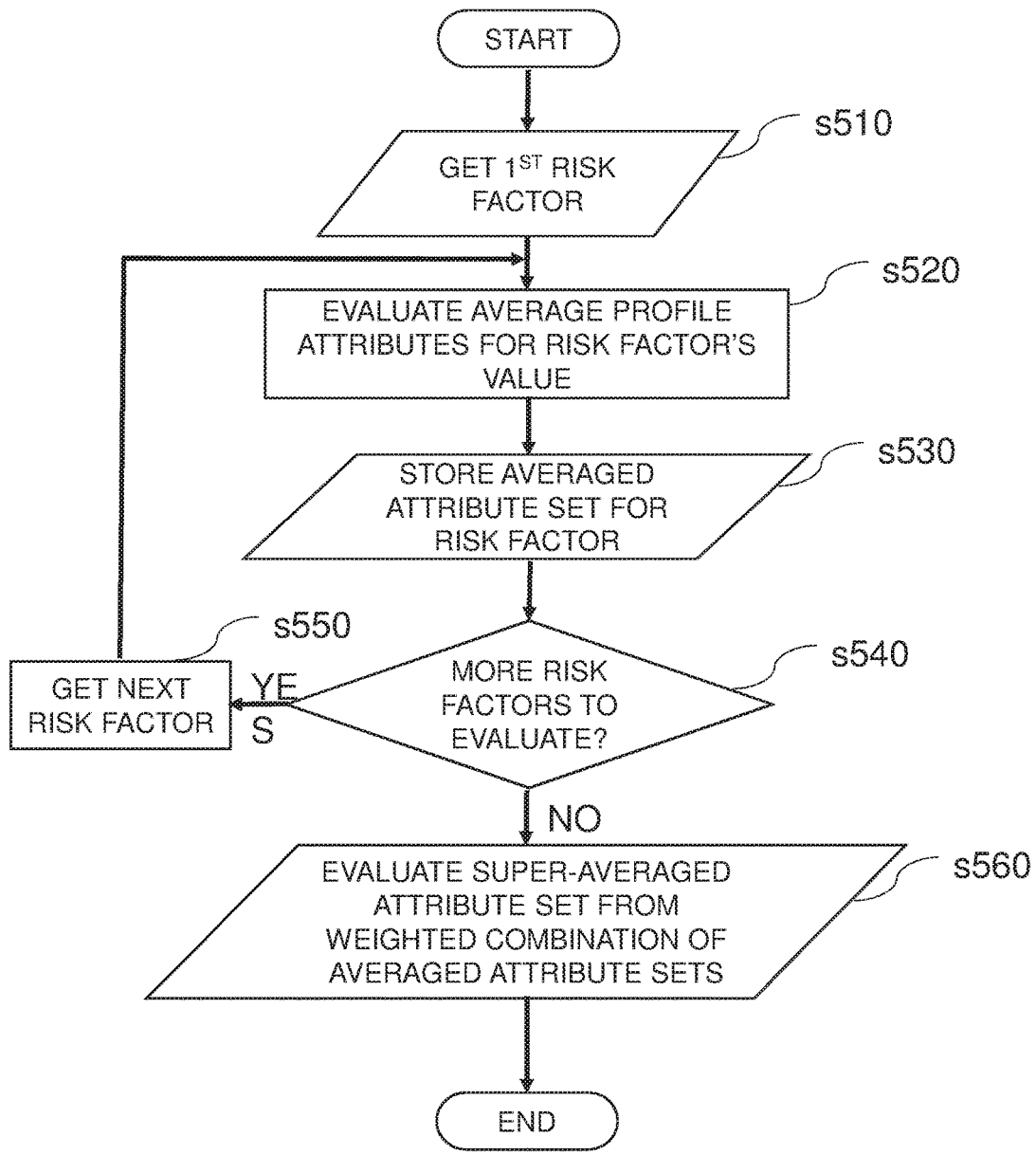
FIG. 5 is a flow chart illustrating the tasks performed by the Compare Risk Factors subroutine of FIG. 4 in accordance with a risk factor by risk factor comparison.

Referring now to FIG. 5, a first comparison method employed by a comparator module according to a first embodiment is now described. The subroutine s40 of this first embodiment (option 1) begins at s510 in which a first risk factor (e.g. product installation method—taking a value of SI or MI) is obtained and then passed to s520. At s520, an average set of profile attributes for that risk factor is then calculated. In the present embodiment, this is done by, for each profile attribute Max Speed, Min Speed, Margin and INP, ordering the attribute values of each line in the database having the same risk factor value and then selecting the mode attribute value within the identified lines sharing the same risk factor value. As an alternative, here instead of using the mode, the median attribute value for the selected lines could be chosen or a percentile value (e.g. the $60^{th}$ percentile value where the lines are ranked for each profile attribute from least conservative to most conservative so that the profile attribute value of the $60^{th}$ percentile profile is as conservative or more conservative than the profile attribute value of the median ($50^{th}$ percentile) profile. The method then proceeds to s530 in which the average attribute values determined in this way (for the risk factor associated with the current iteration) is stored. The method then proceeds to s540 in which it is determined whether there are more risk factors to be evaluated. If so the method proceeds to s550 in which the next risk factor to be evaluated is obtained and then the method reverts to s520.

If at s540 it is determined that all of the risk factors have been evaluated, the method proceeds to s560 in which a super-averaged attribute set is calculated from the stored attribute sets associated with each risk factor. In the present embodiment, this is done by generating a linear combination of all of the attribute factors associated with the different attribute sets, weighted by a suitable weighting associated with the risk factor. An example of this is given in the below example. Alternative embodiments may employ a median or percentile combination approach and an example of this variant is also given in the below example.

EXAMPLE 1

Input Example Data.

| Line index | Product | CP | DSLAM Vendor | CPE ID | Speed compared to expected (fraction) | Region | Time since last fault (days) | Profile |
|---|---|---|---|---|---|---|---|---|
| 1 | MI | A | A | CPE1 | 1.1 | A1 | 500 | 1 |
| 2 | SI | B | A | CPE2 | 0.7 | A1 | | 3 |
| 3 | MI | A | A | CPE1 | 0.9 | A1 | | 1 |
| 4 | MI | A | B | CPE2 | 1.0 | A1 | | 1 |
| 5 | SI | B | B | CPE2 | 0.4 | A2 | | 5 |
| 6 | SI | C | B | CPE1 | 0.8 | A2 | 100 | 3 |
| 7 | SI | C | A | CPE2 | 0.65 | A2 | | 4 |
| 8 | MI | B | B | CPE1 | 1.3 | A2 | | 1 |
| 9 | MI | C | A | CPE1 | 0.7 | A2 | | 4 |

Example Calculations for Option 1
Product Risk
Ordered product is Self-install (SI) from CP A.
The most common profile for SI is:

| Line index | Product | CP | DSLAM Vendor | CPE ID | Speed compared to expected (fraction) | Region | Time since last fault (days) | Profile |
|---|---|---|---|---|---|---|---|---|
| 1 | MI | A | A | CPE1 | 1.1 | A1 | 500 | 1 |
| 2 | SI | B | A | CPE2 | 0.7 | A1 | | 3 |
| 3 | MI | A | A | CPE1 | 0.9 | A1 | | 1 |
| 4 | MI | A | B | CPE2 | 1.0 | A1 | | 1 |
| 5 | SI | B | B | CPE2 | 0.4 | A2 | | 5 |
| 6 | SI | C | B | CPE1 | 0.8 | A2 | 100 | 3 |
| 7 | SI | C | A | CPE2 | 0.65 | A2 | | 4 |
| 8 | MI | B | B | CPE1 | 1.3 | A2 | | 1 |
| 9 | MI | C | A | CPE1 | 0.7 | A2 | | 4 |

Determine most common profile:
Profile 1=0
Profile 2=0
Profile 3=2
Profile 4=1
Profile 5=1

Therefore, the recommended profile is Profile 3.

Equipment Risk

Equipment is determined by the combination of the most common CPE for an ordering CP and the expected DSLAM vendor. Customer is due to be provided on vendor B.

| Line index | Product | CP | DSLAM Vendor | CPE ID | Speed compared to expected (fraction) | Region | Time since last fault (days) | Profile |
|---|---|---|---|---|---|---|---|---|
| 1 | MI | A | A | CPE1 | 1.1 | A1 | 500 | 1 |
| 2 | SI | B | A | CPE2 | 0.7 | A1 | | 3 |
| 3 | MI | A | A | CPE1 | 0.9 | A1 | | 1 |
| 4 | MI | A | B | CPE2 | 1.0 | A1 | | 1 |
| 5 | SI | B | B | CPE2 | 0.4 | A2 | | 5 |
| 6 | SI | C | B | CPE1 | 0.8 | A2 | 100 | 3 |
| 7 | SI | C | A | CPE2 | 0.65 | A2 | | 4 |
| 8 | MI | B | B | CPE1 | 1.3 | A2 | | 1 |
| 9 | MI | C | A | CPE1 | 0.7 | A2 | | 4 |

Ordering CP Is CP A.

| Line index | Product | CP | DSLAM Vendor | CPE ID | Speed compared to expected (fraction) | Region | Time since last fault (days) | Profile |
|---|---|---|---|---|---|---|---|---|
| 1 | MI | A | A | CPE1 | 1.1 | A1 | 500 | 1 |
| 2 | SI | B | A | CPE2 | 0.7 | A1 | | 3 |
| 3 | MI | A | A | CPE1 | 0.9 | A1 | | 1 |
| 4 | MI | A | B | CPE2 | 1.0 | A1 | | 1 |
| 5 | SI | B | B | CPE2 | 0.4 | A2 | | 5 |
| 6 | SI | C | B | CPE1 | 0.8 | A2 | 100 | 3 |
| 7 | SI | C | A | CPE2 | 0.65 | A2 | | 4 |
| 8 | MI | B | B | CPE1 | 1.3 | A2 | | 1 |
| 9 | MI | C | A | CPE1 | 0.7 | A2 | | 4 |

Most common CPE for CP A is CPE1.

This gives a final combination of DSLAM vendor B, CPE 1:

| Line index | Product | CP | DSLAM Vendor | CPE ID | Speed compared to expected (fraction) | Region | Time since last fault (days) | Profile |
|---|---|---|---|---|---|---|---|---|
| 1 | MI | A | A | CPE1 | 1.1 | A1 | 500 | 1 |
| 2 | SI | B | A | CPE2 | 0.7 | A1 | | 3 |
| 3 | MI | A | A | CPE1 | 0.9 | A1 | | 1 |
| 4 | MI | A | B | CPE2 | 1.0 | A1 | | 1 |
| 5 | SI | B | B | CPE2 | 0.4 | A2 | | 5 |
| 6 | SI | C | B | CPE1 | 0.8 | A2 | 100 | 3 |
| 7 | SI | C | A | CPE2 | 0.65 | A2 | | 4 |
| 8 | MI | B | B | CPE1 | 1.3 | A2 | | 1 |
| 9 | MI | C | A | CPE1 | 0.7 | A2 | | 4 |

Determine most common profile:

Profile 1=1

Profile 2=0

Profile 3=1

Profile 4=0

Profile 5=0

Therefore, the recommended profile is 1 or 3. In the case of equal numbers, choose the most conservative, i.e. Profile 3.

CP Risk

Installation practice, modem and helpdesk instruction all contribute to CP performance. Ordering CP is CP A:

| Line index | Product | CP | DSLAM Vendor | CPE ID | Speed compared to expected (fraction) | Region | Time since last fault (days) | Profile |
|---|---|---|---|---|---|---|---|---|
| 1 | MI | A | A | CPE1 | 1.1 | A1 | 500 | 1 |
| 2 | SI | B | A | CPE2 | 0.7 | A1 | | 3 |
| 3 | MI | A | A | CPE1 | 0.9 | A1 | | 1 |
| 4 | MI | A | B | CPE2 | 1.0 | A1 | | 1 |
| 5 | SI | B | B | CPE2 | 0.4 | A2 | | 5 |
| 6 | SI | C | B | CPE1 | 0.8 | A2 | 100 | 3 |
| 7 | SI | C | A | CPE2 | 0.65 | A2 | | 4 |
| 8 | MI | B | B | CPE1 | 1.3 | A2 | | 1 |
| 9 | MI | C | A | CPE1 | 0.7 | A2 | | 4 |

Determine most common profile:

Profile 1=3

Profile 2=0

Profile 3=0

Profile 4=0

Profile 5=0

Therefore, the recommended profile is Profile 1.

Geography Risk

Customer is located in A2.

| Line index | Product | CP | DSLAM Vendor | CPE ID | Speed compared to expected (fraction) | Region | Time since last fault (days) | Profile |
|---|---|---|---|---|---|---|---|---|
| 1 | MI | A | A | CPE1 | 1.1 | A1 | 500 | 1 |
| 2 | SI | B | A | CPE2 | 0.7 | A1 | | 3 |
| 3 | MI | A | A | CPE1 | 0.9 | A1 | | 1 |
| 4 | MI | A | B | CPE2 | 1.0 | A1 | | 1 |
| 5 | SI | B | B | CPE2 | 0.4 | A2 | | 5 |
| 6 | SI | C | B | CPE1 | 0.8 | A2 | 100 | 3 |
| 7 | SI | C | A | CPE2 | 0.65 | A2 | | 4 |
| 8 | MI | B | B | CPE1 | 1.3 | A2 | | 1 |
| 9 | MI | C | A | CPE1 | 0.7 | A2 | | 4 |

Determine most common profile:

Profile 1=1

Profile 2=0

Profile 3=1

Profile 4=2

Profile 5=1

Therefore, the recommended profile is profile 4.

Calculation of Profile

Different weighting factors are used for each parameter type. This is because the influence on performance can vary, i.e. equipment type drives the maximum speed parameter more than others due to memory restrictions, or higher quality components used in the build process. Installation method dominates on error performance due to use of unbalanced home wiring.

This gives a table of weighting factors:

| Risk factor | Max speed | Min speed | Margin | INP |
|---|---|---|---|---|
| Product risk | 0.3 | 0.3 | 0.25 | 0.5 |
| Equipment risk | 0.4 | 0.5 | 0.25 | 0 |
| CP risk | 0.2 | 0 | 0.25 | 0.1 |
| Geography risk | 0.1 | 0.2 | 0.25 | 0.4 |

Profiles selected are:
Product risk=profile 3
Equipment risk=profile 3
CP risk=profile 1
Geography risk=profile 4
Profile attributes are:

| Profile | Max speed | Min speed | Margin | INP |
|---------|-----------|-----------|--------|-----|
| 1 | 100 | 2 | 6 | 0 |
| 2 | 100 | 2 | 9 | 1 |
| 3 | 75 | 2 | 6 | 1 |
| 4 | 50 | 2 | 6 | 2 |
| 5 | 25 | 2 | 6 | 8 |

Simplified calculation for three presented risk factors is:

(CP_risk_weight×profile attribute)+(Product_risk_weight×profile attribute)+(Equipment_risk_weight×profile attribute)+(geography_risk_weight×profile attribute)=determined profile attribute.

For max speed:

(0.2×100)+(0.3×75)+(0.4×75)+(0.1×50)=77.5 Mbps.

For min speed:

(0×2)+(0.3×2)+(0.5×2)+(0.2×2)=2.

For Margin (0.25×6)+(0.25×6)+(0.25×6)+(0.25×6)=6.

For INP (0.1×0)+(0.5×1)+(0×1)+(0.4×2)=1.3

Finally, a look-up against the profile table is used. The closest fit is profile 3.

Variant of Example 1

For a given line:

| Risk Factor | Max Rate | Weighting |
|-------------|----------|-----------|
| CP | 40 | 0.1 |
| DSLAM | 60 | 0.45 |
| CPE | 30 | 0.55 |

Sort by attribute:

| Risk Factor | Max Rate | Weighting |
|-------------|----------|-----------|
| DSLAM | 60 | 0.45 |
| CP | 40 | 0.1 |
| CPE | 30 | 0.55 |

Normalize weightings so they add to 1:

| Risk Factor | Max Rate | Weighting |
|-------------|----------|-----------|
| DSLAM | 60 | 0.41 |
| CP | 40 | 0.09 |
| CPE | 30 | 0.50 |

The median would be 40. The $60^{th}$ percentile (from less to more conservative) would be 30.

With some discrete attributes it might be more appropriate (low processing complexity) to use mode, e.g. an option to retransmit errored data segments (ReTX) On or Off. Mode, however, is the simplest calculation so it is good for solutions requiring minimum processing resources to be expended.

To recap, therefore, the method of operation according to the first embodiment operates thus:

For each risk, the existing DSL lines are grouped by that factor and a ranked list of percentage of lines on each DSL profile is calculated.

A consolidated database may be constructed using these ranked lists and the lines can be "grouped" via database queries "where" the attribution under consideration is matched to the line due to be provisioned. For example, for a given CP, modem combination:

Select providing_CP, CPE_modem, count_profile,
group by providing_CP, CPE_modem,
where providing_CP=CPx, CPE_modem,=Modemxxxx
sort by count_profile By running these queries for each attribute, you will get the most common profile on the existing line base for that grouping. These different risks then need to be combined to give a single profile selection.

The choice of profile is linked to your profile design. If you use banded profiles (i.e. with an upper and lower rate bound), then you need to use the lowest recommended profile to prevent lines.

If you have target margin control, or capped (i.e. a maximum rate only), you are best using a weighted average to combine the profiles. This will require the profiles to be resolved to their individual attributions such as margin, noise protection and line rates.

| Profile | Max speed | Min speed | Margin | INP |
|---------|-----------|-----------|--------|-----|
| 1 | 100 | 2 | 6 | 0 |
| 2 | 100 | 2 | 9 | 1 |
| 3 | 75 | 2 | 6 | 1 |
| 4 | 50 | 2 | 6 | 2 |
| 5 | 25 | 2 | 6 | 8 |

The risk factors would then pick their most common profile:
CP risk=profile 3
Plant risk=profile 2
Product risk=profile 4
Geography risk=profile 1
Equipment risk=profile 1

Each risk factor would have an assigned weighting factor. However, this cannot operate on the profile number, as the variation in each one is non-linear. Instead the scalar value for each column would need to be assessed and matched to the nearest profile, i.e.: CP_risk_weight×profile attribute+plant_risk_weight×profile attribute+Product_risk_weight×profile attribute+Geography_risk_weight×profile attribute+Equipment_risk_weight×profile attribute=determined profile attribute.

This would be completed for each profile attribute—i.e. maximum speed, minimum speed, Margin and INP and for each direction—upstream and downstream to product a set of determine profile attributes. This would then be matched to the profile table for the best fit.

This profile would then be applied to the line as part of the provisioning process.

Figure 6:
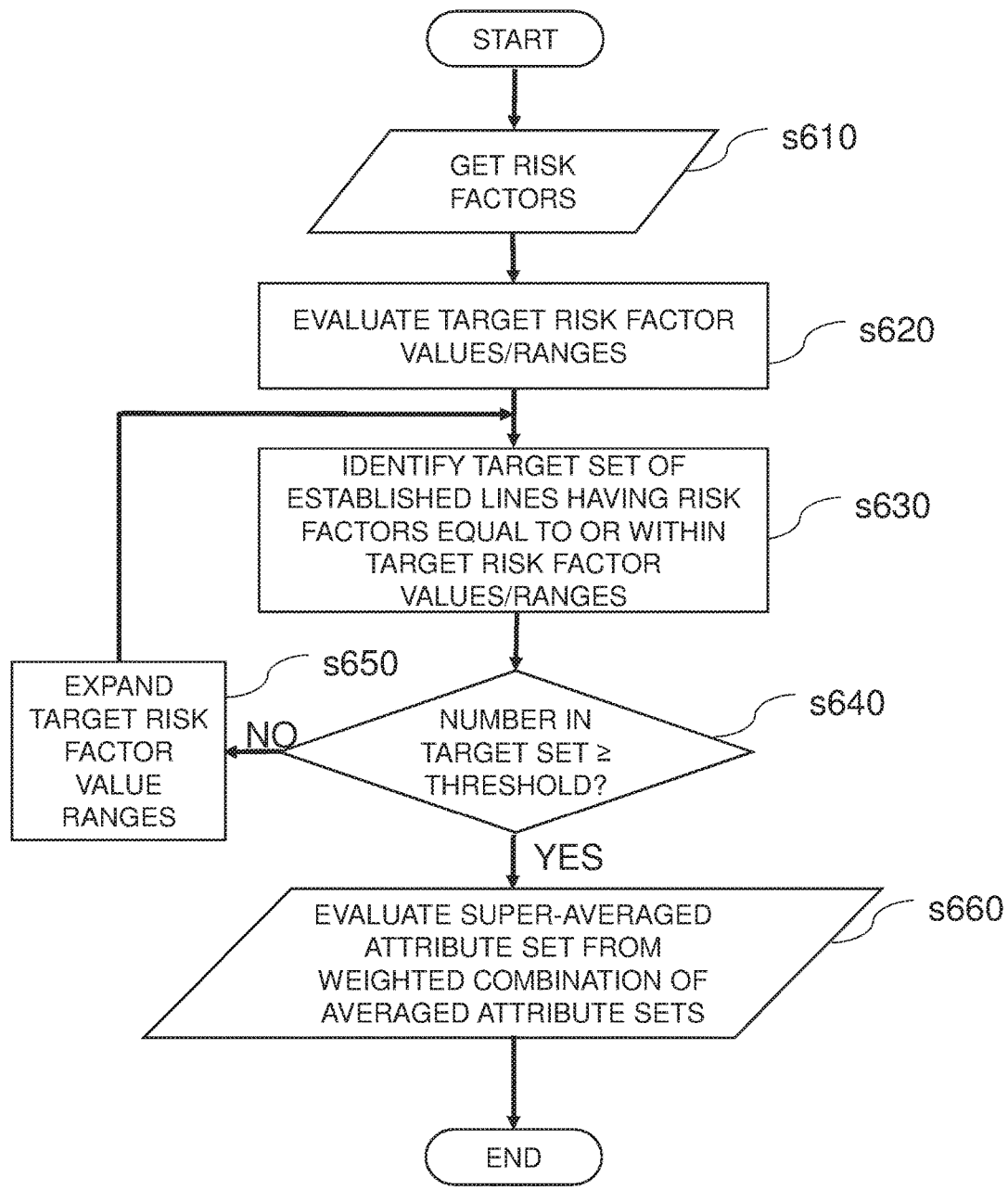
FIG. 6 is a flow chart illustrating the tasks performed by the Compare Risk Factors subroutine of FIG. 4 in accordance with a whole set of risk factors comparison.

Referring now to FIG. 6, the tasks performed by the comparator module according to a second embodiment commence at s610 with the getting of all of the risk factors evaluated for the new order. The method then proceeds to s620 where the target risk factor values or ranges of values are evaluated for a first iteration of the method. In the present example, this involves simply setting the target values to equal the values of the risk factors obtained at s610. As an example these might be product install type=MI (indicating an engineer performed installation) CP=A (indicating that the CP making the order is CP A) DSLAM vendor=X (indicating that the DSLAM 32 is made vendor X), CPE ID=CPE1 (indicating that the most likely CPE device identity is CPE1—in the present example this is estimated based on identifying the mode CPE ID for all lines associated with CP A), Loop category=Short, Region=A1 (corresponding to a postcode region A1). In the present embodiment, a target risk factor is also specified for a time since last fault. This is something which does not necessarily depend upon the new order information but could simply be a value chosen by the network operator in accordance with a desired policy of the network operator. In the present example the value is always set to never—indicating that only established lines which have not experienced any faults should be included in the target set of established lines.

Having thus specified the target values for the target set to be selected, a search is performed at s630 to identify established lines within the line database 140 which satisfy the specified target criteria values for the associated risk factors of the established lines. The number of established lines meeting these specified criteria is then compared with a threshold (which in the present example is set to 200) to determine if a sufficiently large target set has been found. If not, then the method proceeds to s650 in which the target risk factor values are expanded to form ranges (or increased ranges) rather than individual target values using a number of pre-specified expansion rules. These rules can take the form of various IF THEN statements based on heuristics known to network operators. For example experience may show that the type of installation has little impact on very long or long lines, thus an expansion rule could take the form of IF target loop length risk factor=Long or Very Long THEN set product installation target value/Range to ALL values (i.e. either MI or SI). The expansion rules are given in an order and as soon as a single expansion rule is found which causes the target risk factor value ranges to be expanded, the method returns to S630. If the situation arises where no further expansion rules are applicable at s650 and yet the number of lines in the target set is below the threshold amount, a default initial profile can be applied to the new order line.

Once at s640 it is determined that the target set has enough members, the method proceeds to s660 in which an averaged attribute set is obtained by ranking the lines by order of their attribute values and then selecting a predetermined percentile value (or a mode value if no ranking of the attribute value is possible).

This method is illustrated in the following second Example:

EXAMPLE 2

Example of a Few Lines Out of 1000 of Raw Data

| Line index | Product | CP | DSLAM Vendor | CPE ID | Loop Category | Region | Time since last fault (days) | Time since last DLM reset (days) | Profile |
|---|---|---|---|---|---|---|---|---|---|
| 1 | MI | A | X | CPE1 | Long | A1 | 500 | 10 | 1 |
| 2 | SI | B | X | CPE2 | Medium | A1 |  | 400 | 3 |
| 3 | MI | A | X | CPE1 | Short | A1 |  | 60 | 1 |
| 4 | MI | A | Y | CPE2 | Very Long | A1 |  | 5 | 1 |
| 5 | SI | B | Y | CPE2 | Short | A2 |  | 1001 | 5 |
| 6 | SI | C | Y | CPE1 | Very Long | A2 | 100 | 100 | 3 |
| 7 | SI | C | X | CPE2 | Medium | A2 |  | 67 | 4 |
| 8 | MI | B | Y | CPE1 | Short | A2 |  | 97 | 1 |
| 9 | MI | C | X | CPE1 | Very Short | A2 |  | 20 | 4 |
| ... | | | | | | | | | |

Setup Process Repeated Every Week in Offline Process
Discard data from lines with time since reset <=20 days because they have not had time to stabilize, or time since user connect <=20 (not shown here).
Group the time since last fault into 0-10 days, 10-30 days, 30-100, >100 or never.

| Line index | Product | CP | DSLAM Vendor | CPE ID | Loop Category | Region | Time since last fault (days) | Time since last DLM reset (days) | Profile |
|---|---|---|---|---|---|---|---|---|---|
| 2 | SI | B | X | CPE2 | Medium | A1 | Never | 400 | 3 |
| 3 | MI | A | X | CPE1 | Short | A1 | Never | 60 | 1 |
| 5 | SI | B | Y | CPE2 | Short | A2 | Never | 1001 | 5 |
| 6 | SI | C | Y | CPE1 | Very Long | A2 | 30-100 | 100 | 3 |
| 7 | SI | C | X | CPE2 | Medium | A2 | Never | 67 | 4 |
| 8 | MI | B | Y | CPE1 | Short | A2 | Never | 97 | 1 |
| 9 | MI | C | X | CPE1 | Very Short | A2 | Never | 20 | 4 |
| ... | | | | | | | | | |

For each possible combination of Product, CP, DSLAM Vendor, CPE ID, Loop Category, Region, Time since last fault (days) select the lines.
First Example Set of Risk Factors:

| Product | CP | DSLAM Vendor | CPE ID | Loop Category | Region | Time since last fault (days) |
|---------|----|----|----|----|----|----|
| MI | A | X | CPE1 | Short | A1 | Never |

Imagine there are 200 lines in this set and we now have the profile index for each line.
200 lines are deemed to be enough lines to give a valid result.
The following shows the attributes for some profiles:

| Profile | Max speed | Margin | INP |
|---------|-----------|--------|-----|
| 1 | 100 | 6 | 0 |
| 2 | 100 | 9 | 1 |
| 3 | 75 | 6 | 1 |
| 4 | 50 | 6 | 2 |
| 5 | 25 | 6 | 8 |
| ... | | | |
| 34 | 75 | 3 | 1 |
| ... | | | |

Given the profiles for each attribute compute the $60^{th}$ (where $60^{th}$ is close to fast and unstable than median) percentile of the attributes for the lines in the set.
For this set of lines the $60^{th}$ percentiles are Max Speed=75, Margin=3 and INP=1, this equates to a profile index number of 34.
Second Example Set of Risk Factors to Analyze:

| Product | CP | DSLAM Vendor | CPE ID | Loop Category | Region | Time since last fault (days) |
|---------|----|----|----|----|----|----|
| MI | A | X | CPE1 | Very Long | A1 | Never |

Imagine there are 20 lines in this set and we now have the profile index for each line.
We know that when lines are very long the product has no impact on the profile chosen. So for this risk factor we now select lines to analyze from:

| Product | CP | DSLAM Vendor | CPE ID | Loop Category | Region | Time since last fault (days) |
|---------|----|----|----|----|----|----|
| All | A | X | CPE1 | Very Long | A1 | Never |

This gives a further 20 lines to analyze, but there still are not enough lines to be statistically valid.
To get enough lines to analyze would use the algorithm described below to expand the criteria.
Algorithm
Each of the discrete factors are indexed, for example CP. CPa=1, CPb=2, etc.
Each of the continuous factors are reduced to a number of buckets, which may be of none uniform width and not necessarily contain a fixed number of customers. For example, line loss, the indexed bins could be from 0 to 10 dB (@300 kHz) in 0.5 dB steps and 10 to 20 dB in 1 dB steps.
Let us assume there are 5 CPs, 3 stability policies, 2 product rates, 30 loss bins and 2 DSLAM types.
Rather than focusing on profiles, of which BT's NGA network has >4000, the profile can be split and the process applied to the sub profiles. An obvious split would be to break the profile into direction, rate and error control level. The remainder of this description focuses on the downstream.
Setup phase (repeated weekly, monthly, or other)
For each of the 1800 combinations of risk factor select a set of lines to analyze. As a starting point this is the set of existing lines that have that risk factor combination.
The lines to analyze for a factor combination may be drawn may include the lines in nearby bins, either
  a. Because it is know there is no impact within that region
  b. Because there aren't currently enough lines for the single factor combination to give a statistically valid sample.
An example of a) would be that above a certain loss there is known to be no difference between the 2 product rates, so in that region the analysis set of lines are taken for both products.
If there are not enough lines in a single bucket the then factor combinations that lines are drawn from for analysis from are increased until the number of lines is great enough. This is done by including more indexes from one or more factors.
  1 For each risk factor consider the current index+ and $-i_f+1$ (where $i_f$ starts at zero) estimate the fraction $f_f$ of the range of the risk factor included. (e.g. at the start if loss=10 dB then the range=1.5/20=0.075)
  2 Multiple by variability factor (chosen by operator), $f_f * v_f$ (vf may equal infinity, to prevent expansion in that direction.)
  3 For the risk factor with the smallest $f_f * v_f$ set $i_f = i_f + 1$.
  4 Repeat if the number of lines include still not great enough.
For some risk factors, e.g. CP, the expansion to include more lines must be to all CPs, unless CPs can be grouped as having similar impact on profile choice.
There are a set of existing lines to analyze for this risk combination. The profiles on those lines have a rate distribution and an error control level. A function is used to select a single rate level and error correction level. For example the error control level could simply be the mode and the rate level the $70^{th}$ percentile, (closer to fast.) Rate level and error control level are recorded.
Different percentiles can be chosen depending on the operators priority, in high rates/low latency, fewest profile changes or something else.
The expansion of the set of lines, may rest in a profile for a risk combination being outside of the product chosen by the customer. The rate levels and error control levels should be checked and brought within bounds.
Now for each risk factor combination there are rate levels, error control levels both up and downstream. When a new line is provisioned or a line reset the risk factors can be analyzed and a single starting profile selected.
Once enough lines have been selected selection of a single profile for this risk factor following the method described for the previous example risk factor could be used.

After all combinations of risk factor have been evaluated at table like this should be complete.

| Product | CP | DSLAM Vendor | CPE ID | Loop Category | Region | Time since last fault (days) | Profile |
|---------|-----|--------------|--------|---------------|--------|------------------------------|---------|
| SI | B | X | CPE2 | Medium | A1 | Never | 12 |
| MI | A | X | CPE1 | Short | A1 | Never | 34 |
| SI | B | Y | CPE2 | Short | A2 | Never | 5 |
| SI | C | Y | CPE1 | Very Long | A2 | 30-100 | 3 |
| SI | C | X | CPE2 | Medium | A2 | Never | 4 |
| MI | B | Y | CPE1 | Short | A2 | Never | 1 |
| MI | C | X | CPE1 | Very Short | A2 | Never | 4 |
| MI | A | X | CPE1 | Short | A1 | Never | ? |
| ... | | | | | | | |

Selecting First Profile for Lines, when Commissioning a New Line or Resetting the Profile on a Line:
Look up the risk factors for this new line in the table above to select the profile. There is only one profile for each combination of risk factors.
For a line that had a fault 45 days ago and is on the SI product with CP c DSLAM Y CP1 and a very long line in region A2 apply starting profile 3.

The invention claimed is:

1. A method of applying an initial profile to a modem pair connection system, the modem pair connection system comprising a first modem, a corresponding second modem and a metallic wire connection, wherein the first and second modems are operable to establish a data connection between themselves over the metallic wire connection and wherein the metallic wire connection is a new connection to be used for the first time in its current form for supporting the data connection between the first and second modems, the method comprising:
   receiving new-order information associated with a new order placed by a customer for a new broadband data connection to be supplied over the modem pair connection system;
   evaluating a set of risk factors for the new order based on the received new-order information;
   comparing the set of evaluated risk factors for the new order with corresponding risk factors for established modem pair connection systems, wherein none of the modem pairs in the established modem pair connection systems comprise both the first modem and the second modem, using a database storing information about a plurality of established modem pair connection systems which information includes values for the corresponding risk factors of each of the plurality of established modem pair connection systems, or information permitting the evaluation of such values, and information about a profile applied to each of the plurality of established modem pair connection systems;
   determining an initial profile to apply to the modem pair connection system based on the comparison of risk factors; and
   applying the determined initial profile to the modem pair connection system.

2. Processor implementable instructions stored on a non-transitory processor-readable storage medium for causing a processing device to carry out the method of claim 1 during execution of the instructions by the processing device.

3. A non-transitory computer-readable carrier medium carrying processor implementable instructions to, when loaded into and executed by a processor, cause the processor to perform the method as claimed in claim 1.

4. An apparatus for applying an initial profile to a modem pair connection system, the modem pair connection system comprising a first modem, a corresponding second modem and a metallic wire connection, wherein the first and second modems are operable to establish a data connection between themselves over the metallic wire connection and wherein the metallic wire connection is a new connection to be used for the first time in its current form for supporting the data connection between the first and second modems, the apparatus comprising:
   a receiver for receiving new-order information associated with a new order placed by a customer for a new broadband data connection to be supplied over the modem pair connection system;
   an evaluator for evaluating a set of risk factors for the new order based on the received new-order information;
   a line database storing information about a plurality of established modem pair connection systems which information includes values for the corresponding risk factors of each of the plurality of established modem pair connection systems, or information permitting the evaluation of such values, and information about a profile applied to each of the plurality of established modem pair connection systems;
   a comparator for comparing the set of evaluated risk factors for the new order with corresponding risk factors for established modem pair connection systems, wherein none of the modem pairs in the established modem pair connection systems comprise both the first modem and the second modem, using information from the line database;
   a determiner for determining an initial profile to apply to the modem pair connection system based on the comparison of risk factors; and
   an applicator for applying the determined initial profile to the modem pair connection system.

5. The apparatus of claim 4 further comprising a Dynamic Line Management system for monitoring the operation of the modem pair connection system after having applied an initial profile to the system and from time to time applying a different profile to the system in dependence upon the results of monitoring the system, in order to drive the operation of the system towards a target level of operation based on observed operational parameters of the system.

* * * * *